(12) United States Patent
Fukatani et al.

(10) Patent No.: US 12,015,155 B2
(45) Date of Patent: Jun. 18, 2024

(54) COMPOSITIONS FOR FORMING A POROUS INSULATING LAYER, ELECTRODE FOR NON-AQUEOUS ELECTROLYTE RECHARGEABLE BATTERY, RECHARGEABLE BATTERY INCLUDING THE ELECTRODE AND METHOD OF MANUFACTURING THE ELECTRODE

(71) Applicant: Samsung SDI Co., Ltd., Yongin-si (KR)

(72) Inventors: Tomoyuki Fukatani, Yokohama (JP); Koji Hoshiba, Yokohama (JP)

(73) Assignee: Samsung SDI Co., Ltd., Yongin-si (KR)

( * ) Notice: Subject to any disclaimer, the term of this patent is extended or adjusted under 35 U.S.C. 154(b) by 732 days.

(21) Appl. No.: 16/779,193

(22) Filed: Jan. 31, 2020

(65) Prior Publication Data

US 2020/0251739 A1    Aug. 6, 2020

(30) Foreign Application Priority Data

Feb. 1, 2019 (JP) ................................. 2019-017059
Jul. 15, 2019 (KR) ........................ 10-2019-0085265

(51) Int. Cl.
*H01M 4/62* (2006.01)
*H01M 4/13* (2010.01)
(Continued)

(52) U.S. Cl.
CPC ............. *H01M 4/622* (2013.01); *H01M 4/13* (2013.01); *H01M 10/0525* (2013.01); *H01M 10/0569* (2013.01)

(58) Field of Classification Search
CPC ............. H01M 4/02–622; H01M 4/13; H01M 10/05–0525; H01M 10/0569
See application file for complete search history.

(56) References Cited

U.S. PATENT DOCUMENTS 5,356,670 A    10/1994    Briggs et al.
9,225,012 B2   12/2015    Choi et al.
(Continued)

FOREIGN PATENT DOCUMENTS

EP    0 603 659 A1    6/1994
EP    2 894 698 B1    3/2017
(Continued)

OTHER PUBLICATIONS

EPO English Machine Translation of PL191006B1 originally published to Ewa Sobczyńska on Mar. 31, 2006 (Year: 2006).*

(Continued)

*Primary Examiner* — Cynthia H Kelly
*Assistant Examiner* — Niara Trant
(74) *Attorney, Agent, or Firm* — Lewis Roca Rothgerber Christie LLP (57) ABSTRACT

A composition to form a porous insulating layer on an active material layer on a main surface of a current collector current collector is provided. The active material layer includes an active material to electrochemically intercalate and deintercalate lithium ions and an active material layer binder, the composition to form the porous insulating layer includes a solvent including an organic solvent, an insulating inorganic particle, and a binder, and the binder is a polymer obtained by polymerization of monomers including about 30 wt % to about 60 wt % of an aromatic vinyl compound, about 20 wt % to about 69 wt % of (meth)acrylic acid ester, about 5 wt % to about 35 wt % of (meth)acrylic acid ester including a hydroxy group or an ether group, and about 1 wt % to about 10 wt % of a vinyl compound including an acidic functional group, based on a total weight of the binder.

14 Claims, 1 Drawing Sheet

(51) Int. Cl.
   *H01M 10/0525*   (2010.01)
   *H01M 10/0569*   (2010.01)

(56) References Cited

U.S. PATENT DOCUMENTS

| | | |
|---|---|---|
| 2007/0042270 A1 | 2/2007 | Ohata et al. |
| 2008/0044733 A1 | 2/2008 | Ohata et al. |
| 2009/0098446 A1* | 4/2009 | Okada ............... H01M 10/0587 |
| | | 429/94 |
| 2009/0181300 A1 | 7/2009 | Kim |
| 2011/0129730 A1* | 6/2011 | Kasai .................. H01M 4/625 |
| | | 252/502 |
| 2011/0206977 A1 | 8/2011 | Ikeda |
| 2012/0141877 A1 | 6/2012 | Choi et al. |
| 2012/0251878 A1 | 10/2012 | Ueki et al. |
| 2013/0244116 A1 | 9/2013 | Watanabe et al. |
| 2013/0273421 A1* | 10/2013 | Matsumura ......... H01M 50/461 |
| | | 429/246 |
| 2014/0107275 A1 | 4/2014 | Uemura et al. |
| 2014/0287308 A1 | 9/2014 | Okada et al. |
| 2015/0243964 A1* | 8/2015 | Yu ..................... H01M 4/1391 |
| | | 429/233 |
| 2016/0359156 A1* | 12/2016 | Ohkubo ............... H01M 50/489 |
| 2017/0373338 A1 | 12/2017 | Teranishi et al. |
| 2018/0226675 A1 | 8/2018 | Odani et al. |
| 2019/0140284 A1 | 5/2019 | Fukatani et al. |

FOREIGN PATENT DOCUMENTS

| | | |
|---|---|---|
| JP | 11-102730 A | 4/1999 |
| JP | 2006-260782 A | 9/2006 |
| JP | 2008-226566 A | 9/2008 |
| JP | 2010-073547 A | 4/2010 |
| JP | 2010-146887 A | 7/2010 |
| JP | 4524713 B2 | 8/2010 |
| JP | 5035650 B2 | 9/2012 |
| JP | 5077864 B2 | 11/2012 |
| JP | 2014-187349 A | 10/2014 |
| JP | 2015-88253 A | 5/2015 |
| JP | 6079238 B2 | 2/2017 |
| JP | 2017-73318 A | 4/2017 |
| JP | 2017-147136 A | 8/2017 |
| JP | 2018-156787 A | 10/2018 |
| KR | 10-2012-0062333 A | 6/2012 |
| KR | 10-2013-0105479 A | 9/2013 |
| KR | 10-2014-0044835 A | 4/2014 |
| KR | 10-2016-0061317 A | 5/2016 |
| KR | 10-2019-0052606 A | 5/2019 |
| PL | 191006 B1 | 12/1998 |
| WO | 2005-078828 A1 | 8/2005 |
| WO | WO 2013/136426 A1 | 9/2013 |
| WO | WO 2015/111663 A1 | 7/2015 |
| WO | 2016-104782 A1 | 6/2016 |

OTHER PUBLICATIONS

3-Methoxy-3-methyl-1-butanol https://www.sigmaaldrich.com/US/en/product/aldrich/408069 (Year: 2023).*
Extended European Search Report for corresponding European Patent Application No. 20154769.2, dated Mar. 30, 2020, 9 pages.
Notice of Allowance dated Aug. 17, 2022 of the corresponding Korean Patent Application No. 10-2019-0085265 (Korean and English) (4 pages).
European Office Action dated May 31, 2022, in corresponding European Patent Application No. 20154769.2 (5 pages).
Japanese Office Action dated Jan. 16, 2023, of the corresponding Japanese Patent Application No. 2019-017059 (4 pages).

* cited by examiner

COMPOSITIONS FOR FORMING A POROUS INSULATING LAYER, ELECTRODE FOR NON-AQUEOUS ELECTROLYTE RECHARGEABLE BATTERY, RECHARGEABLE BATTERY INCLUDING THE ELECTRODE AND METHOD OF MANUFACTURING THE ELECTRODE

CROSS-REFERENCE TO RELATED APPLICATION

This application claims priority to and the benefit of Japanese Patent Application No. 2019-017059 filed in the Japan Patent Office on Feb. 1, 2019, and Korean Patent Application No. 10-2019-0085265 filed in the Korean Intellectual Property Office on Jul. 15, 2019, the entire content of each of which is herein incorporated by reference.

BACKGROUND

1. Field

One or more aspects of embodiments of the present disclosure relate to a composition for forming a porous insulating layer, an electrode for a non-aqueous electrolyte rechargeable battery, a non-aqueous electrolyte rechargeable battery, and a method of manufacturing the electrode.

2. Description of the Related Art

A non-aqueous electrolyte rechargeable battery is required (or desired) to have relatively high energy density and, also, secure safety. In response to this request, a shutdown function of increasing internal resistance of the battery, by closing pores of a separator through melting, during abnormal overheating due to an internal short circuit of the battery and/or the like is, for example, being used. In addition, a method of preventing or reducing the risk of the internal short circuit by directly forming a porous insulating layer on the surface of an electrode, aside from the shutdown function by the separator has been suggested.

The electrode including this heat-resistance insulating layer may be, for example, manufactured as follows. First, an active material-containing paste as aqueous slurry is coated on a current collector and then, dried and compressed to form an active material layer. On the active material layer, material slurry for a porous insulating layer is coated and dried to form the porous insulating layer.

SUMMARY

In a comparable battery, when the material slurry for a porous insulating layer is coated on the active material layer, a solvent included in the material slurry may expand the active material layer and thus decrease density of the active material layer. For example, because the active material layer has a pore (a porous structure) after the compression, a part of liquid components of the material slurry permeates into the active material layer when the material slurry is coated. The permeated liquid components have an influence on constituting materials of the active material layer. The electrode after the compression has a residual stress, but the permeated liquid components have an influence on properties of the constituting materials of the active material layer, such as elasticity and/or the like and resultantly, destroy (or worsen) a balance of the residual stress and partly cause a residual deformation, and thus increase a thickness of the active material layer. When the thickness of the active material layer is increased beyond the design thickness, there may be a problem in inserting a battery device into an external case. When the active material layer includes (e.g., consists of) a plurality of layers, each layer may show a small thickness increase, but because the battery device is a stacked structure formed by stacking a plurality of electrodes and separators or is a spirally-wound assembly formed by winding a long electrode, a total layer thickness increase of the plurality of active material layers may increase a total thickness of the battery device.

This problem may become more serious, when the active material layer is compressed with a larger pressure in order to manufacture a high energy density non-aqueous electrolyte rechargeable battery. For example, when design electrode density (filling rate) of the active material layer is low, the design electrode density of the active material layer may be set to be high, in advance of the compression of the electrode, by considering a thickness increase of the electrode after forming the porous insulating layer. But because the design electrode density should be even higher according to recently higher energy density demand of a non-aqueous electrolyte rechargeable battery, the electrode may not be compressed enough to higher design electrode density of the active material layer. In addition, when non-oriented graphite particles are, for example, used as a negative active material in order to produce a battery having a long cycle-life, a higher pressure needs to be applied during compression of the electrode. Because the compressed electrode bears a large residual stress and deformation, the thickness increase problem of the active material layer during coating and drying of the material slurry is more and more noticed and thus may be developed up to a production problem of not loading the electrode into an external case of a non-aqueous electrolyte rechargeable battery and/or the like.

In the present disclosure, a composition for forming a porous insulating layer capable of suppressing or reducing a layer thickness increase of an active material layer of an electrode and a method for manufacturing an electrode for a non-aqueous electrolyte rechargeable battery are provided.

An electrode for a non-aqueous electrolyte rechargeable battery manufactured by the method and a non-aqueous electrolyte rechargeable battery are provided.

According to an embodiment, in a composition to form a porous insulating layer on an active material layer on a main surface of a current collector, the active material layer includes an active material to electrochemically intercalate and deintercalate lithium ions and an active material layer binder, the composition to form the porous insulating layer includes a solvent including an organic solvent, an insulating inorganic particle, and a binder, and the binder is a polymer obtained by polymerization of monomers including about 30 wt % to about 60 wt % of an aromatic vinyl compound, about 20 wt % to about 69 wt % of (meth)acrylic acid ester, about 5 wt % to about 35 wt % of (meth)acrylic acid ester including a hydroxy group or an ether group, and about 1 wt % to about 10 wt % of a vinyl compound including an acidic functional group, based on a total weight of the binder. By forming the porous insulating layer on the active material layer, an increase in the thickness of the electrode active material layer may be suppressed or reduced, and separation and peeling phenomena of the composition to form the porous insulating layer may be prevented or reduced, when the electrode is being manufactured. As a result, deterioration of battery performance may be prevented or reduced.

A distance between Hansen solubility parameters of the active material layer binder and the organic solvent may be greater than or equal to about 8.0 $(MPa)^{1/2}$.

A distance between Hansen solubility parameters of the active material and the organic solvent may be greater than or equal to about 5.0 $(MPa)^{1/2}$. In the above range, an increase in the thickness of the electrode active material layer may be further suppressed or reduced, and separation and peeling phenomena of the composition to form the porous insulating layer and may be prevented or reduced, when the electrode is being manufactured. As a result, deterioration of battery performance may be prevented or reduced.

The organic solvent may have a distance (Ra $(MPa)^{1/2}$) of Hansen solubility parameter calculated using Equation 1 of greater than or equal to about 5.0 $(MPa)^{1/2}$.

$$Ra = \{4 \times (18.0 - \delta_{D(solvent)})^2 + (9.3 - \delta_{P(solvent)})^2 + (7.7 - \delta_{H(solvent)})^2\}^{1/2} \quad \text{Equation 1}$$

In Equation 1, $\delta_{D(solvent)}(MPa)^{1/2}$ denotes a solubility parameter due to dispersion force of the organic solvent, $\delta_{P(solvent)}(MPa)^{1/2}$ denotes a solubility parameter due to polarity (dipole-dipole force) of the organic solvent, and $\delta_{H(solvent)}(MPa)^{1/2}$ denotes a solubility parameter due to hydrogen bonding forces of the organic solvent.

When the organic solvent has Ra within the range described herein, an increase in the thickness of the electrode active material layer may be further suppressed or reduced, and separation and peeling phenomena of the composition to form the porous insulating layer and may be prevented or reduced, when the electrode is being manufactured. As a result, deterioration of battery performance may be prevented or reduced.

A boiling point of the organic solvent at 1 atm may be greater than or equal to about 160° C. Within this range, properties changes of the composition to form the porous insulating layer may be suppressed or reduced.

The organic solvent may include an alcohol-based compound. The alcohol-based compound disperses the insulating inorganic particle and the polyolefin-based polymer particle and dissolves the binder. Accordingly, an increase in a thickness of an active material layer of an electrode may be further suppressed or reduced.

The composition to form the porous insulating layer may further include a polyolefin-based polymer particle. In this case, stability of the non-aqueous electrolyte rechargeable battery may be improved.

According to another embodiment, an electrode for a non-aqueous electrolyte rechargeable battery includes a current collector, an active material layer on a main surface of a current collector, and a porous insulating layer formed using the composition to form the porous insulating layer on the active material layer, wherein the active material layer includes an active material to electrochemically intercalate and deintercalate lithium ions and an active material layer binder. In this case, a thickness increase of the active material layer of the manufactured electrode for a non-aqueous electrolyte rechargeable battery may be suppressed or reduced.

According to another embodiment, a non-aqueous electrolyte rechargeable battery includes the electrode for the non-aqueous electrolyte rechargeable battery. In this case, a thickness increase of the active material layer of the manufactured non-aqueous electrolyte rechargeable battery may be suppressed or reduced.

According to another embodiment, a method for manufacturing an electrode for a non-aqueous electrolyte rechargeable battery includes forming a porous insulating layer on an active material layer on a main surface of a current collector, the porous insulating layer being formed using a composition to form a porous insulating layer, wherein the active material layer includes active material to electrochemically intercalate and deintercalate lithium ions and an active material layer binder, the composition to form the porous insulating layer includes a solvent including an organic solvent, an insulating inorganic particle, and a binder, and the binder is a polymer obtained by polymerization of monomers including about 30 wt % to about 60 wt % of an aromatic vinyl compound, about 20 wt % to about 69 wt % of (meth)acrylic acid ester, about 5 wt % to about 35 wt % of (meth)acrylic acid ester including a hydroxy group or an ether group, and about 1 wt % to about 10 wt % of a vinyl compound including an acidic functional group, based on a total weight of the binder. In this case, when the non-aqueous electrolyte rechargeable battery is charged and discharged at a high temperature and at a high voltage, cycle-life may be improved.

A distance between Hansen solubility parameters of the active material layer binder and the organic solvent may be greater than or equal to about 8.0 $(MPa)^{1/2}$.

A distance between Hansen solubility parameters of the active material and the organic solvent may be greater than or equal to about 5.0 $(MPa)^{1/2}$.

An increase in the thickness of the electrode active material layer may be suppressed or reduced, and separation and peeling phenomena of the composition for forming (to form) the porous insulating layer may be prevented or reduced when the electrode is being manufactured, thereby preventing or reducing deterioration of the high temperature cycle-life characteristics of the battery.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, referring to the drawing, one example embodiment is illustrated in more detail. Constituent elements substantially having the same functional structure in the present specification and drawing are assigned by the same numeral and duplicative descriptions thereof will not be repetitively provided.

Composition for Forming Porous Insulating Layer

A composition for forming a porous insulating layer according to an embodiment is described. The composition for forming the porous insulating layer may be used (utilized) for forming a porous insulating layer on an active material layer of an electrode for a non-aqueous electrolyte rechargeable battery, and may include a solvent including an organic solvent, an insulating inorganic particle, and a binder.

Solvent

As described above, the composition for forming the porous insulating layer according to the present embodiment includes a solvent including an organic solvent. An HSP distance (hereinafter, a "first HSP distance") between Hansen solubility parameters (hereinafter, a "HSP") of the binder (active material layer binder) of the active material layer and the organic solvent is greater than or equal to about 8.0 $(MPa)^{1/2}$.

When the distance (first HSP distance) between HSP of the organic solvent included in the composition for forming the porous insulating layer and HSP of the active material layer binder of the active material layer satisfies the above relationship, swelling of the active material layer may be prevented or reduced, and thus a thickness increase of an active material layer of an electrode may be suppressed or reduced, even when the composition for forming the porous insulating layer is coated on the active material layer.

The active material layer is compressed to adjust density and thus bears a residual stress. The active material layer bears the residual stress but maintains a stable shape, for the residual stress therein is balanced.

An organic solvent used in a related art composition for forming a porous insulating layer has a first HSP distance not satisfying the range described herein and thus may expand an active material layer binder. As a result, elasticity of the active material layer binder may be significantly deteriorated, a residual stress in the active material layer may become unbalanced, and resultantly, a residual deformation may occur in a way of increasing a thickness of the active material layer.

On the other hand, in the present embodiment, the organic solvent has the first HSP distance relationship described herein. Accordingly, when the composition for forming the porous insulating layer is coated on the active material layer, the swelling of the active material layer binder is suppressed or reduced, and resultantly, residual deformation, and thus the layer thickness increase, of the active material layer is suppressed or reduced.

HSP is induced (derived) from a regular solution theory and an extended concept of dividing a Hildebrand's solubility parameter (SP), required (derived) from latent heat of evaporation and density of a material into three components of polarity ($\delta_P$), hydrogen bonding forces ($\delta_H$), and dispersion force ($\delta_D$). This is expressed as one point in a three-dimensional space. Accordingly, the first HSP distance is obtained by comparing HSP's of the active material layer binder and the organic solvent as a distance between two points (HSP distance) in the three-dimensional space, as shown in Equation 2. In the present specification, HSP, a distance between HSP's, and each component (polarity $\delta_P$, hydrogen bonding forces $\delta_H$, dispersion force $\delta_D$) are marked based on a unit of $(MPa)^{1/2}$, unless otherwise defined.

$$\text{HSP distance} = \{4 \times (\delta_{D(binder)} - \delta_{D(solvent)})^2 + (\delta_{P(binder)} - \delta_{P(solvent)})^2 + (\delta_{H(binder)} - \delta_{H(solvent)})^2\}^{1/2} \quad \text{Equation 2}$$

In Equation 2, $\delta_{D(binder)}$ denotes a solubility parameter due to dispersion force of the active material layer binder, $\delta_{D(solvent)}$ denotes a solubility parameter due to dispersion force of the organic solvent, $\delta_{P(binder)}$ denotes a solubility parameter due to polarity of the active material layer binder, $\delta_{P(solvent)}$ denotes a solubility parameter due to polarity (dipole-dipole force) of the organic solvent, $\delta_{H(binder)}$ denotes a solubility parameter due to hydrogen bonding forces of the active material layer binder, and $\delta_{H(solvent)}$ denotes a solubility parameter due to hydrogen bonding forces of the organic solvent.

In some embodiments, an upper limit of the first HSP distance is not particularly limited but may be less than or equal to about 30 $(MPa)^{1/2}$ in a suitable solvent.

When a plurality of organic solvents are mixed, HSP of the mixed solvent is calculated from HSP and a volume mixing ratio of each organic solvent, and a distance between HSP of the mixed solvent and HSP of the active material layer binder (first HSP distance) is set to be greater than or equal to about 8.0 $(MPa)^{1/2}$. HSP of the mixed solvent is obtained by applying a weight value of each volume mixing ratio to a point of each solvent in a three-dimensional space of HSP and then, calculating a center of gravity.

When a plurality of active material layer binders are included in the active material layer, the organic solvent may satisfy the first HSP distance with greater than or equal to about 45 wt %, greater than or equal to about 50 wt %, for example, greater than or equal to about 70 wt % and less than or equal to about 100 wt % based on a total weight of the active material layer binder. In some embodiments, the organic solvent may satisfy the first HSP distance relationship with all types (kinds) of active material layer binder in the active material layer. Accordingly, the swelling of the active material layer may be effectively prevented or reduced.

A distance between HSP of the active material of the active material layer and HSP of the organic solvent (hereinafter, a "second HSP distance") may be greater than or equal to about 5.0 $(MPa)^{1/2}$, for example, greater than or equal to about 8.0 $(MPa)^{1/2}$. An upper limit of the second HSP distance is not particularly limited but may be less than or equal to 20 $(MPa)^{1/2}$ in a suitable solvent, except for water. Accordingly, layer thickness increase of the active material layer may be greatly suppressed or reduced.

The active material in the active material layer is mainly bound by the active material layer binder, but a friction generated in the active material may have an influence on a residual stress balance of the active material layer or on maintenance of a layer thickness of the active material layer. When the second HSP distance satisfies the range described herein, an interaction with the surface of the active material, permeation of the active material and the binder on the bonding interface, and permeation of the organic solvent into internal pores of the active material may be suppressed or reduced. As a result, the friction among the active materials is reduced, and/or the active material and the binder are suppressed or protected from peeling on the interface, and accordingly, the layer thickness increase of the active material layer may be greatly suppressed or reduced.

In one or more embodiments, the second HSP distance is calculated in the same way as the first HSP distance is calculated, except for substituting HSP of the active material for HSP of the active material layer binder. When various types (kinds) of organic solvents are mixed in the composition for forming the porous insulating layer, the second HSP distance is calculated in the same way as the first HSP distance is calculated, except for substituting HSP of the active material for HSP of the active material layer binder.

In some embodiments, when various types (kinds) of active materials are included in the active material layer, the organic solvent may satisfy the second HSP distance with greater than or equal to about 45 wt %, greater than or equal to about 50 wt %, for example, greater than or equal to about 70 wt % and less than or equal to about 100 wt % of the active material based on a total weight of the active material. When the organic solvent satisfies the second HSP distance relationship with all types (kinds) of active material in the active material layer, the swelling of the active material layer may be more effectively prevented or reduced.

HSP of each solvent may be obtained by using, for example, a software database of Hansen Solubility Parameter in Practice (4th Edition) and/or the like.

The HSP of the active material layer binder may be obtained as follows. A suitable solvent may be a hydrophilic solvent and/or a hydrophobic solvent such as dimethyl sulfoxide, acetonitrile, dimethyl formamide, methanol, ethanol, 1-butanol, 1,4-dioxane, tetrahydrofuran, toluene, methyl ethyl ketone, acetone, N-methyl-2-pyrrolidone, n-hexane, cyclohexane, methyl isobutyl ketone, n-butyl acetate, chloroform, methyl acetate, pyridine, hexafluoro isopropanol, diethylene glycol, γ-butyrolactone, 2-amino ethanol, cyclo hexanone, 1,1,2,2-tetrabromo ethane, 1-bromo naphthalene, and/or aniline, which may be selected in plural. Each solvent having the weight swelling degree of greater than or equal to about 3.0 is classified as "swelling solvent" and each solvent having the weight swelling degree of less than 3.0 is classified as "non-swelling solvent". Regarding each solvent used in a test of disposing (arranging) each solvent in a HSP three-dimensional space, a sphere including points of solvents classified into a "swelling solvent" and not including points of solvents classified into a "non-swelling solvent" is mapped out. When a radius of the sphere is maximized, a central coordinate of the sphere is regarded as HSP of the active material layer binder.

In some embodiments, when HSP of the active material is difficult to experimentally obtain, HSP may be obtained based on a document value. When the document value of HSP of the active material is difficult to obtain, a document value of a compound corresponding to the active material binder may be used instead. For example, HSP may be obtained based on a document value of graphene described in Langmuir 2008; vol. 24; 10560-4. Referring to the article, graphene has dispersion force ($\delta_D$) of about 18.0 $(MPa)^{1/2}$, polarity ($\delta_P$) of 9.3 $(MPa)^{1/2}$, and hydrogen bonding forces ($\delta_H$) of about 7.7 $(MPa)^{1/2}$. Accordingly, the organic solvent has an HSP distance (Ra) of greater than or equal to about 5.0 $(MPa)^{1/2}$, for example, greater than or equal to about 8.0 $(MPa)^{1/2}$, calculated using Equation 1. Therefore, a layer thickness increase of the active material layer may be suppressed or reduced.

$$Ra = \{4 \times (18.0 - \delta_{D(solvent)})^2 + (9.3 - \delta_{P(solvent)})^2 + (7.7 - \delta_{H(solvent)})^2\}^{1/2}$$ Equation 1

In Equation 1, $\delta_{D(solvent)}$ denotes a solubility parameter due to dispersion force of the organic solvent, $\delta_{P(solvent)}$ denotes a solubility parameter due to polarity (dipole-dipole force) of the organic solvent, and $\delta_{H(solvent)}$ denotes hydrogen bonding forces of the organic solvent.

This organic solvent may include any suitable solvent satisfying the HSP relationship described herein, and particularly, the first HSP distance relationship, without a particular limit. For example, the organic solvent may include a glycol alkyl ether-based compound, an alcohol-based compound, and/or the like. The organic solvent may easily (suitably) satisfy the first HSP distance relationship with an active material layer binder and may be suitably used in terms of dispersion of insulating inorganic particles and/or dissolution of a porous insulating layer binder, as described later. For example, when the alcohol-based compound is used, the first HSP distance and the second HSP distance may be simultaneously (or concurrently) increased. In some embodiments, the organic solvent may be used as a single solvent alone or a mixture of two or more.

The alcohol-based compound may have, for example, a carbon number of C3 to C10, for example, C4 to C8, and may be linear or branched lower alkyl alcohol and/or aliphatic alcohol that is unsubstituted or substituted with alkoxy group. The alcohol-based compound may be, for example, 2-propanol, 1-butanol, 1-pentenol, 1-hexanol, 1-heptanol, 1-octanol, 2-methyl-1-pentenol, 2-ethyl-1-pentenol, 2-methyl-1-hexanol, 2-ethyl-1-hexanol, 2-methyl-1-heptanol, 2-ethyl-1-heptanol, 2-propyl-1-heptanol, 1-methoxy-2-propanol, 3-methoxy-3-methyl-1-butanol, 3-ethoxy-3-methyl-1-butanol, 3-methoxy-3-methyl-1-pentenol, 3-ethoxy-3-methyl-1-pentenol, 1-nonanol, 1-decanol, and/or the like, and for example, the alcohol-based compound may be 1-butanol, 1-hexanol, 2-ethyl-1-hexanol, and/or 3-methoxy-3-methyl-1-butanol, and in some embodiments, 2-ethyl-1-hexanol and/or 3-methoxy-3-methyl-1-butanol.

When the alcohol-based compound is substituted with the alkoxy group, the carbon number of the alkoxy group is not particularly limited but may be 1 to 4, 1 to 3, for example, 1 or 2.

The alcohol-based compound may be monovalent alcohol or polyhydric alcohol, and in some embodiments, a monovalent alcohol. Accordingly, a thickness increase of the active material layer may be further suppressed or reduced.

The glycol alkyl ether-based compound may be monoalkylene glycol monoalkyl ether (such as ethylene glycol monomethyl ether, ethylene glycol monoethyl ether, and/or the like), dialkylene glycol monoalkyl ether (such as diethylene glycol monomethyl ether, diethylene glycol monoethyl ether, and/or the like), trialkylene glycol monoalkyl ether (such as triethylene glycol monomethyl ether, triethylene glycol monoethyl ether, and/or the like), and/or other alkylene glycol monoalkyl ether having a polymerization degree of 3 or greater, and may be, for example, triethylene glycol monomethyl ether, diethylene glycol monomethyl ether, and/or ethylene glycol monoethyl ether.

The carbon number of the alkoxy group of the glycol alkyl ether-based compound may not be particularly limited, but may be 1 to 4, 1 to 3, for example 1 or 2.

The glycol alkyl ether-based compound may include an ethylene glycol backbone.

A boiling point of the organic solvent may be, for example, greater than or equal to about 100° C., for example, greater than or equal to about 130° C. and less than or equal to about 250° C. Accordingly, during formation of the porous insulating layer, volatilization of the solvent and viscosity changes caused thereby may be prevented or reduced, and the porous insulating layer having a substantially uniform thickness may be formed.

The solvent may include water. The water has excellent (or suitable) solubility for the active material layer binder of the active material layer and may be appropriate for dissolution and dispersion of each material of the composition for forming the porous insulating layer. An amount of the water in the solvent may be less than or equal to about 70 wt %, for example, less than or equal to about 50 wt % based on a total weight of the solvent.

In the composition for forming the porous insulating layer, an amount of the solvent is not particularly limited, and any suitable amount may be selected according to preparation conditions, but may be greater than or equal to about 15 wt % and less than or equal to about 60 wt %, for example, greater than or equal to about 20 wt % and less than or equal to about 45 wt %.

Insulating Inorganic Particle

The composition for forming the porous insulating layer includes an insulating inorganic particle. The insulating inorganic particle is a solid main component of the composition for forming the porous insulating layer. The insulating inorganic particle ensures insulation properties between the separator and the active material layer and prevents or reduces the risk of internal short-circuit.

The insulating inorganic particle is not particularly limited, and may be, for example, oxide particles (such as iron oxide, silica ($SiO_2$), alumina ($Al_2O_3$), $TiO_2$, $BaTiO_2$, ZrO, and/or the like), nitride particles (such as boron nitride, aluminum nitride, silicon nitride, and/or the like), sparingly soluble ion crystalline particles (such as calcium fluoride, barium fluoride, barium sulfate, and/or the like), covalent bond-type crystalline particles (such as silicon, diamond, and/or the like), clay particles (such as montmorillonite, and/or the like), materials derived from minerals (such as boehmite, zeolite, apatite, kaolin, mullite, spinel, olivine, and/or the like), and/or artificial products of the materials. In addition, it may be conductive particles of metal particles, oxide particles (such as $SnO_2$, indium tin oxide (ITO), and/or the like), conductive particles which are surface-treated with materials having electrical insulation properties, and/or the like. The conductive particles may be carbon black, graphite, and/or the like.

An average particle diameter of the insulating inorganic particles is not particularly limited and may be for example greater than or equal to about 0.01 μm and less than or equal to about 5 μm, and in some embodiments, greater than or equal to about 0.1 μm and less than or equal to about 1 μm.

In the present specification, the average particle diameter refers to a volume-based cumulative frequency D50 particle diameter and the average particle diameter may be measured by a laser diffraction scattering-type particle distribution meter.

An amount of the insulating inorganic particle in the composition for forming the porous insulating layer may be, for example, greater than or equal to about 20 wt % and less than or equal to about 98 wt %, and in some embodiments, greater than or equal to about 30 wt % and less than or equal to about 95 wt % based on a solid content of the composition for forming the porous insulating layer.

Binder

The composition for forming the porous insulating layer includes a binder (porous insulating layer binder).

The binder may be a polymer obtained by polymerization of monomers including about 30 wt % to about 60 wt % of an aromatic vinyl compound, about 20 wt % to about 69 wt % of (meth)acrylic acid ester, about 5 wt % to about 35 wt % of (meth)acrylic acid ester including a hydroxy group or an ether group, and about 1 wt % to about 10 wt % of a vinyl compound including an acidic functional group based on a total weight of the binder.

The aromatic vinyl compound may include styrene, p-methylstyrene, m-methylstyrene, o-methylstyrene, o-t-butyl styrene, m-t-butyl styrene, p-t-butyl styrene, p-chloro styrene, o-chloro styrene, and/or the like, and in an embodiment, styrene.

The (meth)acrylic acid ester may include methyl (meth)acrylate, ethyl(meth)acrylate, butyl (meth)acrylate, isopropyl (meth)acrylate, octyl (meth)acrylate, 2-ethylhexyl (meth)acrylate, isobutyl (meth)acrylate, pentyl (meth)acrylate, n-hexyl (meth)acrylate, isoamyl (meth)acrylate, lauryl (meth)acrylate, stearyl (meth)acrylate, isobornyl (meth)acrylate, and/or the like.

The (meth)acrylic acid ester including the hydroxy group may include 2-hydroxyethyl (meth)acrylate, 2-hydroxypropyl (meth)acrylate, 2-hydroxybutyl (meth)acrylate, 2-hydroxy-3-phenoxy propyl (meth)acrylate, 2-acryloyloxyethyl-2-hydroxyethyl phthalate, and/or the like.

The (meth)acrylic acid ester including the ether group may include ethoxy-diethylene glycol (meth)acrylate, methoxy-triethylene glycol(meth)acrylate, tetrahydrofurfuryl (meth)acrylate, phenoxy-polyethylene glycol(meth)acrylate, phenoxy diethylene glycol (meth)acrylate, phenoxy ethyl (meth)acrylate, methoxyethyl (meth)acrylate, glycidyl (meth)acrylate, and/or the like.

The vinyl compound including the acidic functional group may include, for example, acrylic acid, methacrylic acid, itaconic acid, maleic acid, 2-acrylamide-2-methylpropanesulfonic acid, and/or 2-methacrylo oxyethyl phosphate.

Bonding methods of the copolymer and the polymer included in the porous insulating layer binder are not particularly limited, but the polymer may be a random copolymer, an alternative copolymer, a periodic copolymer, a block copolymer, and/or a graft copolymer.

Weight average molecular weights of the copolymer and the polymer included in the porous insulating layer binder are not particularly limited, but may be, for example, greater than or equal to about 50,000 and less than or equal to about 2,000,000, and in some embodiments, greater than or equal to about 100,000 and less than or equal to about 1,000,000. The weight average molecular weight may be measured through gel permeation chromatography of converting polyethylene oxide (PEO) into a standard material.

An amount of the porous insulating layer binder of the composition for forming the porous insulating layer may be, for example, greater than or equal to about 2 wt % and less than or equal to about 10 wt %, and in some embodiments, greater than or equal to about 3 wt % and less than or equal to about 7 wt % based on a solid content of the composition for forming the porous insulating layer.

Polyolefin-Based Polymer Particle

In one or more embodiments, the composition for forming the porous insulating layer may include a polyolefin-based polymer particle. The polyolefin-based polymer particle has a relatively low melting point, and thus it may be molten and may block or reduce transport of lithium ions at the time of abnormal heating of a non-aqueous electrolyte rechargeable battery. Accordingly, stability of the non-aqueous electrolyte rechargeable battery may be further improved.

The polyolefin-based polymer particle may be, for example, a polyethylene-based polymer particle, a polypropylene-based polymer particle, and/or the like.

An average particle diameter of the polyolefin-based polymer particle is not particularly limited but may be, for example, about 0.5 μm to about 6 μm. In one or more embodiments, the porous insulating layer may be formed as a relatively thin film (for example, having a thickness of less than or equal to about 4 μm). Accordingly, the average particle diameter of the polyolefin-based polymer particle needs to be relatively small. However, the polyolefin-based polymer particle may be manufactured to have not a spherical shape but a flake-type (flake shape), depending on a manufacturing method, wherein the porous insulating layer may be formed to have a thinner film thickness than the average particle diameter of the polyolefin-based polymer particles in a particle size distribution system.

The polyolefin-based polymer particles, when they have a small particle diameter, may be relatively difficult to be dispersed, but the polymer obtained by polymerizing monomers including an aromatic vinyl compound, (meth)acrylic acid ester, and (meth)acrylic acid ester including a hydroxy group or an ether group may be used as a binder to uniformly disperse the polyolefin-based polymer particles in the porous insulating layer.

An amount of the polyolefin-based polymer particle of the composition for forming the porous insulating layer may be, for example, about 20 wt % to about 80 wt % based on a solid content of the composition for forming the porous insulating layer.

As described above, the composition for forming the porous insulating layer according to an embodiment includes the organic solvent, the insulating inorganic particle, and the binder, the distance between Hansen solubility parameters of the organic solvent and the active material layer binder of the active material layer is greater than or equal to about 8.0 $(MPa)^{1/2}$, the distance between Hansen solubility parameters of the organic solvent and the active material of the active material layer is greater than or equal to about 5.0 $(MPa)^{1/2}$, and the binder includes a polymer obtained by polymerization of monomers including about 30 wt % to about 60 wt % of an aromatic vinyl compound, about 20 wt % to about 69 wt % of (meth)acrylic acid ester, about 5 wt % to about 35 wt % of (meth)acrylic acid ester including a hydroxy group or an ether group, and about 1 wt % to about 10 wt % of a vinyl compound including an acidic functional group based on a total weight of the binder. Thereby, when the composition for forming the porous insulating layer is coated on an active material layer, expansion of the active material layer may be suppressed or reduced.

Structure of Non-Aqueous Electrolyte Rechargeable Battery

Figure 1:
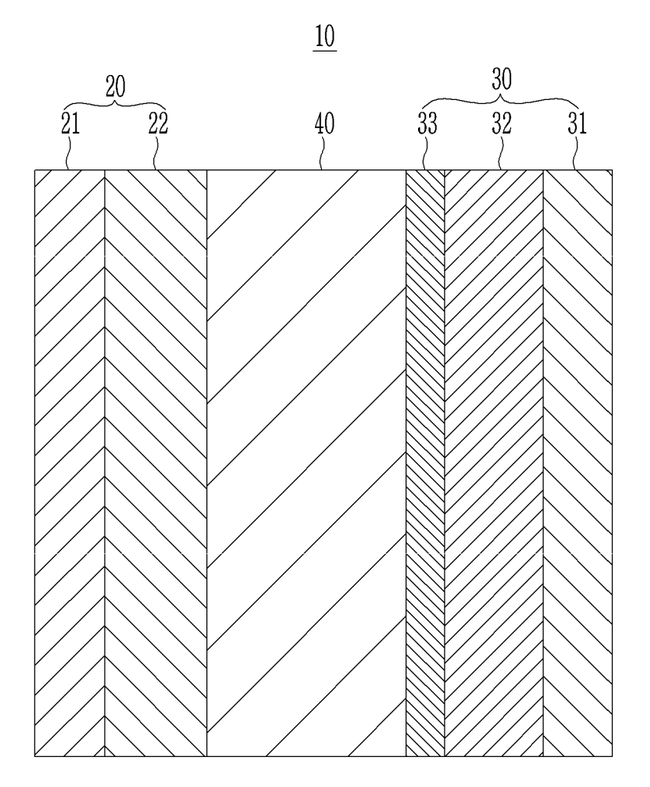
Drawing is a schematic structure of a non-aqueous electrolyte rechargeable battery according to an embodiment.

Hereinafter, referring to the drawing, an example structure of a non-aqueous electrolyte rechargeable battery 10 according to an embodiment is described.

The drawing is an explanation view showing a schematic structure of a non-aqueous electrolyte rechargeable battery according to an embodiment.

The non-aqueous electrolyte rechargeable battery 10 according to an embodiment includes a negative electrode 30 that is the electrode for a non-aqueous electrolyte rechargeable battery according to an embodiment of the present disclosure.

The non-aqueous electrolyte rechargeable battery 10 of the drawing is an example of a rechargeable battery according to the present embodiment. As shown in the drawing, the non-aqueous electrolyte rechargeable battery 10 includes a positive electrode 20, a negative electrode 30, and a separator layer 40. The shape of the non-aqueous electrolyte rechargeable battery 10 is not particularly limited, but it may be, for example, cylindrical, prismatic, laminate, button, and/or the like.

The positive electrode 20 includes a current collector 21 and a positive active material layer 22 on a main surface of the current collector 21. The current collector 21 may use (include) any suitable conductor and may be, for example, aluminum (Al), stainless steel, and/or nickel-plated steel.

In the present specification, a "main surface" denotes a surface having a larger area than the other surfaces among all the surfaces of a thin plate. For example, the main surface in the thin film-shaped current collector 21 may include one or more large surfaces of the current collector 21, but not a cross section, a side, or the like.

The positive active material layer 22 includes at least a positive active material and a binder (positive active material layer binder), and may further include a conductive agent. Amounts of each of the positive active material, the conductive agent, and the binder are not particularly limited, and may be any amount suitable for application in a non-aqueous electrolyte rechargeable battery.

The positive active material may be, for example, a transition metal oxide including lithium and/or a solid solution oxide, and may be a material being capable of electrochemically intercalating and deintercalating lithium ions without particular limitation. The transition metal oxide including lithium may be a Li·Co-based composite oxide such as $LiCoO_2$, a LiNiCoMn-based composite oxide (such as $LiNi_xCo_yMn_zO_2$), a Li·Ni-based composite oxide (such as $LiNiO_2$), and/or a Li·Mn-based composite oxide (such as $LiMn_2O_4$).

The solid solution oxide may be, for example, $Li_aMn_xCo_yNi_zO_2$ ($1.15 \leq a \leq 1.43$, $0.45 \leq x \leq 0.60$, $0.10 \leq y \leq 0.15$, $0.20 \leq z \leq 0.28$), $LiMn_xCo_yNi_zO_2$ ($0.3 \leq x \leq 0.85$, $0.10 \leq y \leq 0.3$, $0.10 \leq z \leq 0.3$), $LiMn_{1.5}Ni_{0.5}O_4$, and/or the like. An amount of the positive active material is not particularly limited, and may be any amount suitable for application in a positive active material layer of a non-aqueous electrolyte rechargeable battery. In addition, as a positive active material, the compound may be used alone or in plural.

The conductive agent may be, for example, carbon black (such as ketjen black and/or acetylene black), natural graphite, artificial graphite, fiber-shaped carbon (such as carbon nanotube, graphene, carbon nanofibers, and/or the like), and/or a composite of the fiber-shaped carbon and carbon black. However, the conductive agent is not particularly limited as long as it suitably increases conductivity (e.g., electrical conductivity) of the positive electrode. An amount of the conductive agent is not particularly limited and may be any amount suitable for application in a positive active material layer of a non-aqueous electrolyte rechargeable battery.

The active material layer binder may include a fluorine-containing resin (such as polyvinylidene fluoride (polyvinylidene difluoride) and/or the like), a styrene-containing resin (such as a styrene butadiene rubber, and/or the like), an ethylene-propylene-diene terpolymer, an acrylonitrile-butadiene rubber, a fluoroelastomer, polyvinyl acetate, polymethylmethacrylate, polyethylene, polyvinyl alcohol, carboxymethyl cellulose, and/or a derivative thereof (e.g., a salt of carboxymethyl cellulose), and/or nitrocellulose. However, the positive active material layer binder is not particularly limited as long as it suitably binds the positive active material and the conductive agent on the current collector 21, and has oxidation resistance to endure a high potential of a positive electrode and electrolyte solution stability. An amount of the positive active material layer binder is not particularly limited and may be any amount suitable for application in a positive active material layer of a non-aqueous electrolyte rechargeable battery.

The positive active material layer 22 may be, for example, manufactured by dispersing a positive active material, a conductive agent, and the positive active material layer binder in an organic solvent (for example, N-methyl-2-pyrrolidone) to prepare positive electrode slurry and coating the positive electrode slurry on a current collector 21 followed by drying and compressing the same. A density of the positive active material layer 22 after compression is not particularly limited and may be any density suitable for application in a positive active material layer of a non-aqueous electrolyte rechargeable battery.

The negative electrode 30 is an example of a negative electrode for a rechargeable battery according to the present embodiment.

The negative electrode 30 includes a thin-film negative current collector 31, a negative active material layer 32 contacting the negative current collector 31, and a porous insulating layer 33 on the negative active material layer 32.

The negative current collector 31 is not particularly limited but may be, for example, made of copper, aluminum, iron, nickel, stainless steel and/or an alloy thereof, and/or steel plated therewith, for example nickel-plated steel. The negative current collector 31 is, for example, made of copper, nickel and/or an alloy thereof.

(The negative active material layer 32 contacts the negative current collector 31, and in some embodiments, one main surface thereof is adhered on the negative current collector 31. The negative active material layer 32 includes negative active material. In the present embodiment, the negative active material layer 32 includes a negative active material and a binder (negative active material layer binder).

The negative active material is not particularly limited as long as it is a material capable of electrochemically intercalating and deintercalating lithium ions and may be, for example, a graphite active material (artificial graphite, natural graphite, a mixture of artificial graphite and natural graphite, natural graphite coated with artificial graphite), a Si-based active material and/or a Sn-based active material (for example particulates such as silicon (Si), tin (Sn), and/or oxide(s) thereof, and/or alloy(s) of silicon and/or tin as a basic material), metal lithium, and/or a titanium oxide-based compound (such as $Li_4Ti_5O_{12}$). The negative active material may include at least one of the described materials. The oxide of silicon is represented by $SiO_x$ (0<x≤2).

An amount of the negative active material of the negative active material layer 32 is not particularly limited but may be, for example, about 60 wt % to about 100 wt %, for example, about 80 wt % to about 99.5 wt %, or about 90 wt % to about 99 wt %.

The negative active material layer binder may be the same as the positive active material layer binder of the positive active material layer 22. Among the materials, at least one binder material selected from the styrene-containing resin, the fluorine-containing resin, polyethylene, polyvinyl alcohol, and carboxymethyl cellulose may be used. The styrene-containing resin may be a styrene butadiene rubber, and the fluorine-containing resin may be polyvinylidene fluoride. The carboxymethyl celluloses may be carboxymethyl cellulose, and/or a carboxymethyl cellulose derivative such as a salt of carboxymethyl cellulose. The salt of carboxymethyl cellulose may be, for example, a salt of carboxymethyl cellulose and an alkali metal ion, for example, sodium carboxymethyl cellulose, potassium carboxymethyl cellulose, lithium carboxymethyl cellulose, and/or the like.

An amount of the negative active material layer binder of the negative active material layer 32 is not particularly limited and may be, for example, about 0 to about 40 wt %, for example, about 0.5 to about 20 wt %, or about 1 to about 10 wt %.

The negative active material layer 32 may be, for example, manufactured by dispersing the negative active material and the negative active material layer binder in a suitable solvent (e.g., water, etc.) to prepare negative electrode slurry, and coating the negative electrode slurry on a negative current collector 31 followed by drying and compressing the same. A thickness of the negative active material layer 32 after compression is not particularly limited and may be any thickness suitable for application in a negative active material layer of a lithium ion rechargeable battery. The negative active material layer 32 may optionally include a graphite active material.

In some embodiments, the negative active material layer 32 may be manufactured by a physical deposition method and/or a chemical deposition method such as thermal evaporation, ion plating, sputtering and/or the like, besides the above-described method.

The porous insulating layer 33 may be formed on the negative active material layer 32 so that it may be positioned between the negative electrode 30 and the separator layer 40. The porous insulating layer 33 may prevent or reduce any short-circuit of the non-aqueous electrolyte rechargeable battery 10. In the present embodiment, the porous insulating layer 33 is manufactured by coating the composition for forming the porous insulating layer and drying the same. Accordingly, the porous insulating layer includes, for example, the insulating inorganic particle and the porous insulating layer binder, and in some embodiments, the polyolefin-based polymer particle. The insulating inorganic particle, the porous insulating layer binder, and the polyolefin-based polymer particle are the same as described above.

The separator layer 40 may include a separator and an electrolyte solution. The separator is not particularly limited, and any suitable separator of a lithium ion rechargeable battery may be used. The separator may be a porous film and/or a non-woven fabric having excellent high rate discharge performance alone or in a combination thereof. The separator may be coated with an inorganic material such as $Al_2O_3$, $Mg(OH)_2$, $SiO_2$, and/or the like, and the inorganic material may be included as a filler.

Materials constituting the separator may be, for example, a polyolefin-based resin (such as polyethylene, polypropylene, and/or the like), a polyester-based resin (such as polyethylene terephthalate, polybutylene terephthalate, and/or the like), polyvinylidene fluoride, a vinylidene fluoride-hexafluoro propylene copolymer, a vinylidene fluoride-perfluoro vinyl ether copolymer, a vinylidene fluoride-tetrafluoro ethylene copolymer, a vinylidene fluoride-trifluoro ethylene copolymer, a vinylidene fluoride-fluoro ethylene copolymer, a vinylidene fluoride-hexafluoro acetone copolymer, a vinylidene fluoride-ethylene copolymer, a vinylidene fluoride-propylene copolymer, a vinylidene fluoride-trifluoro propylene copolymer, a vinylidene fluoride-tetrafluoro ethylene-hexafluoro propylene copolymer, a vinylidene fluoride-ethylene-tetrafluoro ethylene copolymer, and/or the like. A porosity of the separator is not particularly limited and a porosity of any suitable separator for a lithium ion rechargeable battery may be applied.

The electrolyte solution includes an electrolytic salt and a solvent.

The electrolytic salt may be any suitable salt used in a lithium ion battery without particular limitation. For example, the electrolytic salt may include an inorganic ion salt including at least one selected from lithium (Li), sodium (Na), and potassium (K) (such as $LiClO_4$, $LiBF_4$, $LiAsF_6$, $LiPF_6$, LiSCN, LiBr, LiI, $Li_2SO_4$, $Li_2B_{10}Cl_{10}$, $NaClO_4$, NaI, NaSCN, NaBr, $KClO_4$, KSCN, and/or the like), an organic ion salt (such as $LiCF_3SO_3$, $LiN(CF_3SO_2)_2$, $Li(FSO_2)_2N$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phthalate, lithium stearyl sulfonate, lithium octyl sulfonate, lithium dodecyl benzenesulfonate, and/or the like), and the electrolytic salt may be used alone or in plural. The electrolytic salt may include a lithium salt.

A concentration of the electrolytic salt is not particularly limited but may be, for example, about 0.5 mol/L to about 2.0 mol/L.

The solvent is a non-aqueous solvent may dissolve the electrolytic salt. The solvent may be, for example, selected from cyclic carbonate esters (such as propylene carbonate, ethylene carbonate, butylene carbonate, chloro ethylene carbonate, vinylene carbonate, and/or the like), cyclic esters (such as γ-butyrolactone, γ-valero lactone, and/or the like), linear carbonates (such as dimethyl carbonate, diethyl carbonate, ethylmethyl carbonate, and/or the like), linear esters (such as methyl formate, methyl acetate, methyl butyrate, and/or the like), tetrahydrofuran and/or a derivative thereof, ethers (such as 1,3-dioxane, 1,4-dioxane, 1,2-dimethoxy ethane, 1,4-dibutoxyethane, methyl diglyme, and/or the like), nitriles (such as acetonitrile, benzonitrile, and/or the like), dioxolane and/or a derivative thereof, ethylene sulfide, sulfolane, sultone, and/or a derivative of any of the above compounds, which may be used alone or as a mixture of two or more. When the solvent is used as a mixture of two or more, a mixing ratio of each solvent may be any suitable mixing ratio for a lithium ion rechargeable battery.

The electrolyte solution may include one or more suitable additives such as a negative electrode SEI (Solid Electrolyte Interface) forming agent, a surfactant, and/or the like. Such additives may be, for example, succinic anhydride, lithium bis(oxalate)borate, lithium tetrafluoroborate, a dinitrile compound, propane sultone, butane sultone, propene sultone, 3-sulfolene, fluorinated arylether, fluorinated acrylate, and/or the like. Concentrations of such additives may be any suitable concentration of additives in a lithium ion rechargeable battery.

In the present embodiment, the non-aqueous electrolyte rechargeable battery 10 may use the composition for forming the porous insulating layer according to the present embodiments during manufacture of the porous insulating layer 33 of the negative electrode 30. Accordingly, a thickness increase of the negative active material layer 32 may be suppressed or reduced.

In one or more embodiments, the negative electrode 30 includes the porous insulating layer 33 described above, but the present disclosure is not limited thereto. For example, the positive electrode 20 may include the porous insulating layer. In this case, a layer thickness increase of the positive active material layer 22 of the positive electrode 20 may be suppressed or reduced. In this case, the negative electrode 30 may not include the porous insulating layer.

Method of Manufacturing Electrode for Non-Aqueous Electrolyte Rechargeable Battery Next, a method of manufacturing an electrode for a non-aqueous electrolyte rechargeable battery according to an embodiment is described.

The method of manufacturing an electrode for a non-aqueous electrolyte rechargeable battery includes forming a porous insulating layer using the composition for forming the porous insulating layer on an active material layer positioned on a current collector. However, the method of manufacturing a non-aqueous electrolyte rechargeable battery is not limited to the following method but may include any suitable manufacturing method.

The positive electrode 20 is manufactured as follows.

First, a positive active material, a conductive agent, and a positive active material layer binder are mixed in a desirable (or suitable) ratio and then dispersed in an organic solvent (for example, N-methyl-2-pyrrolidone) to prepare positive electrode slurry. Next, the positive electrode slurry is formed (for example, coated) on the current collector 21 and dried to manufacture a positive active material layer 22. Herein, the coating method has no particular limit but may be performed by using, for example, a knife coater, a gravure coater, a reverse roll coater, a slit die coater, and/or the like. Hereinafter, as an example, each coating may be performed utilizing the same method.

In some embodiments, the positive active material layer 22 is compressed with a press to a desirable (or set) thickness to manufacture the positive electrode 20. Herein, a thickness of the positive active material layer 22 is not particularly limited and may be any suitable thickness of a positive active material layer of a non-aqueous electrolyte rechargeable battery.

The negative electrode 30 is manufactured utilizing substantially the same method as the method of manufacturing the positive electrode 20. First, the negative active material and the negative active material layer binder are mixed in a desirable (or suitable) ratio to disperse them in a solvent (for example, water) and to prepare negative electrode slurry. The negative electrode slurry may optionally include a graphite active material. Subsequently, the negative electrode slurry is formed (for example, coated) on the current collector 31, and then dried to manufacture a negative active material layer 32. Then, the negative active material layer 32 is compressed with a press to a desirable (or set) thickness. Herein, a thickness of the negative active material layer 32 is not particularly limited and may be any suitable thickness of a negative active material layer of a non-aqueous electrolyte rechargeable battery. Then, a porous insulating layer 33 is formed using the composition for forming the porous insulating layer of the present embodiments. For example, the composition for forming the porous insulating layer is coated on the negative active material layer 32 and dried to form the porous insulating layer 33. Accordingly, the negative electrode 30 is manufactured.

When the porous insulating layer 33 is formed using the composition for forming the porous insulating layer according to the present embodiments, thereby swelling of the negative active material layer 32 may be suppressed or reduced during the coating of the composition for forming the porous insulating layer. As a result, a thickness increase of the negative electrode 30 may be prevented or reduced.

Method of Manufacturing Non-Aqueous Electrolyte Rechargeable Battery

Subsequently, the separator 40 is placed between the positive electrode 20 and the negative electrode 30 to manufacture an electrode assembly. Then, the electrode assembly is shaped to have a desired shape (for example, a cylinder, a prism, a laminate, a button, and/or the like) and then inserted into a container having the corresponding shape. Then the electrolyte solution is injected into the container and impregnated into each pore in the separator 40. Thus, the non-aqueous electrolyte rechargeable battery 10 is manufactured.

In the present embodiments, the porous insulating layer 33 is formed on the negative active material layer 32, but the present disclosure is not limited thereto. For example, a porous insulating layer may be formed on the positive active material layer 22 using the composition for forming the porous insulating layer. In this case, it is not necessary that a porous insulating layer is also formed on the negative active material layer 32.

Hereinafter, examples and comparative examples are described. However, the following examples are solely for purposes of illustration and the present disclosure is not limited to the following examples.

EXAMPLES

Synthesis of Binder for Porous Insulating Layer
Synthesis of Binder 1

22.0 g of styrene, 4.0 g of 2-ethylhexyl acrylate, 12.0 g of methoxylethyl acrylate, 2.0 g of methacrylic acid, 0.8 g of sodium dodecylbenzene sulfonate, and 115 g of ion exchange water were injected into a 500 ml flask equipped with a stirrer and a thermometer. A reaction system thereof was substituted with nitrogen, an aqueous solution obtained by dissolving 0.27 g of potassium persulfate in 5.0 g of ion exchange water was added to the mixture and then, reacted for 12 hours, while the mixture was stirred at 600 rpm, while a temperature of the reaction system was increased and reached 70° C.

After the reaction, non-volatile components of the solution were measured to be 25.0 wt % (a conversion rate: 100%). Then, 200 mL of ethanol was added to the solution, which was concentrated through heating and distillation under a reduced pressure to have the non-volatile components of 40 wt % after the reaction, to precipitate and separate a solid.

The separated solid was twice washed with 100 mL of ethanol and dried at 80° C. for 10 hours under a reduced pressure. Subsequently, 460 g of 3-methoxy-3-methyl-1-butanol (MMB) was added thereto and then, stirred at room temperature to obtain a colorless transparent copolymer solution having a solid content of 8%.

Synthesis of Binder 2

A copolymer solution having a solid content of 8% was synthesized according to substantially the same method as that of Binder 1, except that 14.0 g of styrene, 20.0 g of 2-ethylhexyl acrylate, 4.0 g of methoxyethyl acrylate, and 2.0 g of methacrylic acid were used.

Synthesis of Binder 3

A copolymer solution having a solid content of 8% was synthesized according to substantially the same method as that of Binder 1, except that 18.0 g of styrene, 12.0 g of 2-ethylhexyl acrylate, 8.0 g of methoxyethyl acrylate, and 2.0 g of methacrylic acid were used.

Synthesis of Binder 4

A copolymer solution having a solid content of 8% was synthesized according to substantially the same method as that of Binder 1, except that 18.8 g of styrene, 12.0 g of 2-ethylhexyl acrylate, 8.0 g of methoxyethyl acrylate, and 1.2 g of methacrylic acid were used.

Synthesis of Binder 5

A copolymer solution having a solid content of 8% was synthesized according to substantially the same method as that of Binder 1, except that 16.8 g of styrene, 12.0 g of 2-ethylhexyl acrylate, 8.0 g of methoxyethyl acrylate, and 3.2 g of methacrylic acid were used.

Synthesis of Binder 6

A copolymer solution having a solid content of 8% was synthesized according to substantially the same method as that of Binder 1, except that 20.0 g of styrene, 12.0 g of 2-ethylhexyl acrylate, and 8.0 g of methoxyethyl acrylate were used, and no methacrylic acid was used.

Synthesis of Binder 7

A copolymer solution having a solid content of 8% was synthesized according to substantially the same method as that of Binder 1, except that 26.0 g of styrene, 12.0 g of 2-ethylhexyl acrylate, and 2.0 g of methacrylic acid were used, and no methoxyethyl acrylate was used.

Synthesis of Binder 8

A copolymer solution having a solid content of 8% was synthesized according to substantially the same method as that of Binder 1, except that 10.0 g of styrene, 12.0 g of 2-ethylhexyl acrylate, 16.0 g of methoxyethyl acrylate, and 2.0 g of methacrylic acid were used.

Synthesis of Binder 9

Vinyl butyral-vinyl alcohol-vinyl acetate (a weight ratio of 80/18/2) copolymer powder having a weight average molecular weight of greater than or equal to 70,000 and less than or equal to 100,000 (Sigma Aldrich Co., Ltd.) was dissolved in 3-methoxy-3-methyl-1-butanol to obtain a copolymer solution having a solid content of 10%.

Synthesis of Binder 10

70.6 mg of azoisobutyronitrile, 14.0 g of acryloyl morpholine, and 6.0 g of acrylic acid were injected in a 500 ml flask equipped with a stirrer and a thermometer and were stirred, and then, 180.0 g of 3-methoxy-3-methyl-1-butanol and 5.088 g of ethanolamine were sequentially added thereto. After substituting a reaction system thereof with nitrogen, the obtained mixture was reacted for 12 hours, while stirred at 600 rpm, while increasing a temperature in the reaction system up to 65° C.

After the reaction, non-volatile components in the solution were measured to be 9.7 wt % (a conversion rate: 96%). Subsequently, an initiator residue and a nonreaction monomer were removed from the solution through heating and distillation under a reduced pressure. The resultant solution was cooled down to room temperature, and ethanol amine was added thereto to adjust pH to 8 and thus prepare a copolymer solution having a solid content of 10%.

Manufacture of Negative Electrode

Negative active material mix slurry was prepared by mixing artificial graphite (a flake assembly, a specific surface area: 1.7 m$^2$/g, and an average particle diameter: 15 μm), sodium carboxymethyl cellulose salt, and a styrene butadiene-based aqueous dispersion solid in a solid weight ratio of 97.5:1.0:1.5 and then, dissolving and dispersing the mixture in a water solvent. Subsequently, the negative active material mix slurry was coated to be 10 μm thick on both surfaces of a copper foil current collector, dried, and compressed with a roll press to manufacture a negative electrode having a negative active material layer on the copper foil current collector. A coating amount of the negative electrode was 26 mg/cm$^2$ (on both surfaces), and an electrode density was 1.65 g/cm$^3$. Herein, styrene butadiene rubber and carboxymethyl cellulose were used as a binder of the negative active material layer.

Example 1

Preparation of Composition for Forming Porous Insulating Layer

Binder 1 and boehmite particles having an average particle diameter (D50) of 0.9 μm were mixed in a solid weight ratio of 5:45, and 3-methoxy-3-methyl-1-butanol (MMB) was added thereto and then, dispersed with a beads mill to obtain dispersion (a composition for forming a porous insulating layer).

This dispersion was examined with a 50 μm grind gauge to check a particle diameter, and when there was no aggregation product, "Good" mark was given, but when the aggregation product did not disappear despite repetitive dispersions, "aggregation product appears" mark was given, and the results are shown in Table 1.

This composition for forming a porous insulating layer was coated to be 3 μm thick on each surface of the negative active material layer of the negative electrode with a wire bar and then, dried. The drying was performed in a 60° C. oven for 15 minutes.

Each thickness of the negative active material layer of the negative electrode having the porous insulating layer was measured and compared with each thickness of the negative active material layer before forming the porous insulating layer to calculate a thickness increment per each surface. Thicknesses of the negative active material layer and the porous insulating layer were obtained by forming the cross section of the electrode with a cross-section polisher (CP), examining it with a scanning electron microscope (SEM), and averaging 10 thickness measurements within one's sight.

The negative electrode was cut with a Thomson's knife and welded with a nickel lead wire (a negative electrode tab) at the terminal end to obtain a negative electrode. After cutting it with the Thomson knife, when chips and boehmite particles (insulating inorganic particles of the porous insulating layer) at the terminal end were detached away, "peeled" mark was given, but when there were no chips and boehmite particles, "not peeled" mark was given. The results are shown in Table 1.

Manufacture of Positive Electrode

Lithium nickel cobalt manganese oxide ($LiNi_{0.8}Co_{0.1}Mn_{0.1}O_2$), carbon black, and polyvinylidene fluoride (PVDF) in a solid weight ratio of 96:2:2 were dissolved and dispersed in N-methyl pyrrolidone to prepare positive electrode mixture slurry.

Subsequently, the positive electrode mixture slurry was coated on both sides of a 12 μm-thick aluminum foil current collector and then, dried and compressed to form a positive active material layer.

An electrode coating amount was 42 $mg/cm^2$ (converted into an amount of both surfaces), electrode density was 3.6 $g/cm^3$, and a total thickness of a current collector and the positive active material layer was 120 μm.

Subsequently, an aluminum lead wire (a positive electrode tab) was welded at the terminal end of the current collector to manufacture a positive electrode.

Manufacture of Non-Aqueous Electrolyte Rechargeable Battery Cells

The separator, the negative electrode, the separator, and the positive electrode were stacked in order to manufacture an electrode stacked structure.

Subsequently, the manufactured electrode stacked structure and an electrolyte solution were placed in a laminate film (an external material) formed of three layers of polypropylene/aluminum/nylon and then, sealed to manufacture a rechargeable battery cell. Herein, each lead wire already welded to each electrode was pulled out of the laminate film.

The electrolyte solution was prepared by mixing ethylene carbonate and dimethyl carbonate in a volume ratio of 3:7 and dissolving 1 M of $LiPF_6$ and 1 wt % of vinylene carbonate therein.

The obtained rechargeable battery cell was placed between two sheets of SUS plates and fixed there, so that the laminate film might not be transformed, to manufacture the rechargeable battery cell before initial charge.

Subsequently, the rechargeable battery cell before initial charge was constant current-charged at 0.1 CA of design capacity to 4.3 V and constant voltage-charged at 0.05 CA cut-off at 4.3 V and then, constant current-discharged at 0.5 CA to 2.7 V cut-off to obtain a non-aqueous electrolyte rechargeable battery cell, whose discharge capacity was regarded as initial discharge capacity.

Evaluation of High Temperature Cycle-Life

The manufactured non-aqueous electrolyte rechargeable battery cell was charged at 45° C. at 0.5 CA and discharged at 1 CA as one cycle, and the process was performed for 200 cycles. The 200th cycle discharge capacity was divided by the initial discharge capacity to obtain capacity retention. The results are shown in Table 1.

Example 2

A non-aqueous electrolyte rechargeable battery cell was manufactured according to substantially the same method as Example 1, except that Binder 1 was replaced with Binder 2 to prepare a composition for forming a porous insulating layer, and coating the composition was coated on the negative active material layer to manufacture a negative electrode.

Capacity retention was measured in the same manner as in Example 1, and the results are shown in Table 1.

Example 3

A non-aqueous electrolyte rechargeable battery cell was manufactured according to substantially the same method as Example 1, except that Binder 1 was replaced with Binder 3 to prepare a composition for forming a porous insulating layer, and the composition was coated on the negative active material layer to manufacture a negative electrode.

Capacity retention was measured in the same manner as in Example 1, and the results are shown in Table 1.

Example 4

A non-aqueous electrolyte rechargeable battery cell was manufactured according to substantially the same method as Example 1 except that Binder 1 was replaced with Binder 4 to prepare a composition for forming a porous insulating layer, and the composition was coated on the negative active material layer to manufacture a negative electrode.

Capacity retention was measured in the same manner as in Example 1, and the results are shown in Table 1.

Example 5

A non-aqueous electrolyte rechargeable battery cell was manufactured according to substantially the same method as Example 1, except that Binder 1 was replaced with Binder 5 to prepare a composition for forming a porous insulating layer, and the composition was coated on the negative active material layer to manufacture a negative electrode.

Capacity retention was measured in the same manner as in Example 1, and the results are shown in Table 1.

Example 6

High density polyethylene wax and 3-methoxy-3-methyl-1-butanol (MMB) as polyolefin-based polymer particles were adjusted and added to have a solid content of 15% and dispersed with a beads mill to obtain dispersion.

The polyolefin-based polymer particles had an average particle diameter (D50) of 5.2 μm, and when examined with an electron microscope, had a flake shape.

Binder 3 was mixed with boehmite particles having an average particle diameter (D50) of 0.9 μm in a solid weight ratio of 5:22.5, and 3-methoxy-3-methyl-1-butanol (MMB) was added thereto and adjusted to have a solid content of 40% and then, dispersed with a beads mill to obtain dispersion.

When this dispersion was examined with a 50 μm grind gauge to check a particle diameter, there was no aggregation product.

The polymer particle dispersion and the boehmite particle dispersion were mixed in a solid weight ratio of 22.5:27.5 to prepare a composition for forming a porous insulating layer including polymer particles and boehmite particles and having a solid content of 23%.

A negative electrode and a non-aqueous electrolyte rechargeable battery cell including the same were manufactured according to substantially the same method as Example 1 except that the composition for forming the porous insulating layer of this Example 6 was used.

Capacity retention was measured in the same manner as in Example 1, and the results are shown in Table 1.

Comparative Example 1

A non-aqueous electrolyte rechargeable battery cell was manufactured according to substantially the same method as Example 1, except that Binder 1 was replaced with Binder 9 to prepare a composition for forming a porous insulating layer, and the composition was coated on the negative active material layer to manufacture a negative electrode.

Capacity retention was measured in the same manner as in Example 1, and the results are shown in Table 1.

Comparative Example 2

A non-aqueous electrolyte rechargeable battery cell was manufactured according to substantially the same method as Example 1, except that Binder 1 was replaced with Binder 10 to prepare a composition for forming a porous insulating layer, and the composition was coated on the negative active material layer to manufacture a negative electrode.

Capacity retention was measured in the same manner as in Example 1, and the results are shown in Table 1.

Comparative Example 3

A non-aqueous electrolyte rechargeable battery cell was manufactured according to substantially the same method as Example 6, except that Binder 3 was replaced with Binder 10 to prepare a composition for forming a porous insulating layer, and the composition was coated on the negative active material layer to manufacture a negative electrode.

Capacity retention was measured in the same manner as in Example 1, and the results are shown in Table 1.

Comparative Example 4

A non-aqueous electrolyte rechargeable battery cell was manufactured according to substantially the same method as Example 1, except that Binder 1 was replaced with Binder 6 to prepare a composition for forming a porous insulating layer, and the composition was coated on the negative active material layer to manufacture a negative electrode.

Herein, an aggregation product was generated in the composition for forming the porous insulating layer. Accordingly, coating defects due to a part of the aggregation product were observed when the composition was coated to be 3 μm thick on the negative active material layer. A satisfactorily (suitably) coated part thereof was used according to the same method as Example 1 to manufacture a non-aqueous electrolyte rechargeable battery cell.

Capacity retention was measured in the same manner as in Example 1, and the results are shown in Table 1.

Comparative Example 5

A composition for forming a porous insulating layer was prepared according to substantially the same method as Example 1, except that Binder 1 was replaced with Binder 7.

The aggregation product was large in the composition for forming the porous insulating layer and thus disabled (did not allow for) 3 μm thickness coating of the composition on the negative active material layer. A measurement was performed according to the same as Example 1, and the result is shown in Table 1.

Comparative Example 6

A non-aqueous electrolyte rechargeable battery cell was manufactured according to substantially the same method as Example 1, except that Binder 1 was replaced with Binder 8 to prepare a composition for forming a porous insulating layer, and the composition was coated on the negative active material layer to manufacture a negative electrode.

Capacity retention was measured in the same manner as in Example 1, and the results are shown in Table 1.

Comparative Example 7

A non-aqueous electrolyte rechargeable battery cell was manufactured according to substantially the same method as Example 1, except that Binder 1 was replaced with acryl-based rubber (poly(n-butyl acrylate)), and N-methyl-2-pyrrolidone (NMP) was used as a solvent to prepare a composition for forming a porous insulating layer, and the composition was coated on the negative active material layer to manufacture a negative electrode.

Capacity retention was measured in the same manner as in Example 1, and the results are shown in Table 1.

In Table 1, "St" denotes styrene, "2EHA" denotes 2-ethylhexyl acrylate, "MeOEA" denotes methoxyethyl acrylate, "MAA" denotes methacrylic acid, "VB" denotes vinyl butyrate, "VA" denotes vinyl alcohol, "Vac" denotes vinyl acetate, "ACMO" denotes acryloyl morpholine, and "AA" denotes acrylic acid.

In addition, "HSP distance 1" denotes a distance between a Hansen solubility parameter of a binder (styrene butadiene rubber, SBR) and a Hansen solubility parameter of an organic solvent, "HSP distance 2" denotes a distance between a Hansen solubility parameter of a binder (carboxymethyl cellulose, CMC) and the Hansen solubility parameter of the organic solvent, and "HSP distance 3" denotes a distance between a Hansen solubility parameter of an active material and the Hansen solubility parameter of the organic solvent.

TABLE 1

| | Requirements | | | | | | | Working effect | | | |
|---|---|---|---|---|---|---|---|---|---|---|---|
| | Organic solvent | HSP distance 1[(MPa)$^{1/2}$] | HSP distance 2[(MPa)$^{1/2}$] | HSP distance 3[(MPa)$^{1/2}$] | Polyolefin polymer particle | Binder | Composition [weight ratio] | Composition for forming porous insulating layer | Thickness increase of active material layer | Peeling | High temperature cycle test (%) |
| Ex. 1 | MMB | 9.2 | 13.3 | 7.2 | None | Binder 1 | St/2EH/MeOEA/MAA = 55/10/30/5 | Good | 4.3 | Not peeled | 88 |
| Ex. 2 | MMB | 9.2 | 13.3 | 7.2 | None | Binder 2 | St/2EHA/MeOEA/MAA = 35/50/10/5 | Good | 4.3 | Not peeled | 88 |
| Ex. 3 | MMB | 9.2 | 13.3 | 7.2 | None | Binder 3 | St/2EHA/MeOEA/MAA = 45/30/20/5 | Good | 4.2 | Not peeled | 91 |
| Ex. 4 | MMB | 9.2 | 13.3 | 7.2 | None | Binder 4 | St/2EHA/MeOEA/MAA = 47/30/20/3 | Good | 4.2 | Not peeled | 90 |
| Ex. 5 | MMB | 9.2 | 13.3 | 7.2 | None | Binder 5 | St/2EHA/MeOEA/MAA = 42/30/20/8 | Good | 4.3 | Not peeled | 90 |
| Ex. 6 | MMB | 9.2 | 13.3 | 7.2 | Present | Binder 3 | St/2EHA/MeOEA/MAA = 45/30/20/5 | Good | 4.8 | Not peeled | 90 |
| Comp. Ex. 1 | MMB | 9.2 | 13.3 | 7.2 | None | Binder 9 | VB/VA/VAc = 80/18/2 | Good | 4.2 | Not peeled | 79 |
| Comp. Ex. 2 | MMB | 9.2 | 13.3 | 7.2 | None | Binder 10 | ACMO/AA = 70/30 DELETEDTEXTS | Good | 4.6 | Peeled | 85 |
| Comp. Ex. 3 | MMB | 9.2 | 13.3 | 7.2 | Present | Binder 10 | ACMO/AA = 70/30 DELETEDTEXTS | Good | 4.8 | Peeled | 84 |
| Comp. Ex. 4 | MMB | 6.6 | 13.3 | 7.2 | None | Binder 6 | St/2EHA/MeOEA = 50/30/20 | Aggregation product appears | 4.6 | Peeled | 86 |
| Comp. Ex. 5 | MMB | | 13.3 | 7.2 | None | Binder 7 | St/2EHA/MAA = 65/30/5 | Aggregation product appears | — | — | — |
| Comp. Ex. 6 | MMB | | 13.3 | 7.2 | None | Binder 8 | St/2EHA/MeOEA/MAA = 25/30/40/5 | Good | 4.5 | Not peeled | 81 |
| Comp. Ex. 7 | NMP | 6.6 | 16.3 | 3 | None | Acrylic rubber | — | Good | 8.8 | Not peeled | 84 |

The compositions for forming a porous insulating layer according to Examples 1 to 6 were within the range of the present embodiments and thus exhibited no detachment and satisfactory (suitable) high temperature cycle-life characteristics.

When Comparative Examples 1 to 6 were compared with Examples, an effect of suppressing (or reducing) a negative electrode thickness increase was obtained in a substantially equal level, but Comparative Examples 1 and 6 exhibited deteriorated high temperature cycle-life characteristics, and Comparative Examples 2 to 4 exhibited peeling of the boehmite particles (insulating inorganic particles) when the negative electrodes were cut. In addition, Comparative Example 4 exhibited an aggregation product formed of agglomerated boehmite particles, and it is believed, without being bound by any particular theory, that the reason is that the boehmite particles were not sufficiently dispersed. In the composition for forming the porous insulating layer of Comparative Example 5, it is believed that an aggregation product was generated due to low dissolubility of a binder for a solvent. Accordingly, a satisfactory (desirable) composition for forming a porous insulating layer was not obtained.

As for Comparative Example 7, since a Hansen solubility parameter of a solvent is out of the range of the present embodiments, negative electrode thickness expansion after forming a porous insulating layer was greatly generated (negative electrode thickness was significantly increased).

It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, expressions such as "at least one of", "one of", and "selected from", when preceding a list of elements, modify the entire list of elements and do not modify the individual elements of the list.

As used herein, the term "and/or" includes any and all combinations of one or more of the associated listed items.

Further, the use of "may" when describing embodiments of the present disclosure refers to "one or more embodiments of the present disclosure".

It will be understood that when an element is referred to as being "on," "connected to," or "coupled to" another element, it may be directly on, connected, or coupled to the other element or one or more intervening elements may also be present.

When an element is referred to as being "directly on," "directly connected to," or "directly coupled to" another element, there are no intervening elements present.

Spatially relative terms, such as "beneath," "below," "lower," "above," "upper," "bottom," "top" and the like, may be used herein for ease of description to describe one element or feature's relationship to another element(s) or feature(s) as illustrated in the FIGURES. It will be understood that the spatially relative terms are intended to encompass different orientations of the device in use or operation in addition to the orientation depicted in the figures. For example, if the device in the FIGURES is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

As used herein, the terms "substantially", "about", and similar terms are used as terms of approximation and not as terms of degree, and are intended to account for the inherent deviations in measured or calculated values that would be recognized by those of ordinary skill in the art.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Hereinbefore, example embodiments of the present disclosure were illustrated, referring to the accompanied drawing, but the present disclosure is not limited thereto. While this disclosure has been described in connection with what is presently considered to be practical example embodiments, it is to be understood that the present disclosure is not limited to the disclosed embodiments, but, on the contrary, is intended to cover various modifications and equivalent arrangements included within the spirit and scope of the appended claims and their equivalents.

DESCRIPTION OF SYMBOLS

10: non-aqueous electrolyte rechargeable battery
20: positive electrode
21: positive electrode current collector
22: positive active material layer
30: negative electrode
31: negative current collector
32: negative active material layer
33: porous insulating layer
40: separator layer

What is claimed is:

1. A composition to form a porous insulating layer on an active material layer on a main surface of a current collector,
wherein the active material layer comprises an active material to electrochemically intercalate and deintercalate lithium ions and an active material layer binder,
the composition to form the porous insulating layer comprises a solvent, an insulating inorganic particle, and a porous insulating layer binder, the solvent comprising an organic solvent, and
the porous insulating layer binder is a polymer obtained by polymerization of monomers selected from the group consisting of about 30 wt % to about 60 wt % of an aromatic vinyl compound, about 20 wt % to about 69 wt % of (meth)acrylic acid ester, about 5 wt % to about 35 wt % of (meth)acrylic acid ester comprising a hydroxy group or an ether group, and about 1 wt % to about 10 wt % of a vinyl compound comprising an acidic functional group, based on a total weight of the porous insulating layer binder,
wherein a distance between Hansen solubility parameters of the active material layer binder and the organic solvent is greater than or equal to about 8.0 MPa$^{1/2}$.

2. The corn position of claim 1, wherein a distance between Hansen solubility parameters of the active material and the organic solvent is greater than or equal to about 5.0 MPa$^{1/2}$.

3. The composition of claim 1, wherein the organic solvent has a distance (Ra) with respect to graphene of Hansen solubility parameter calculated utilizing Equation 1 of greater than or equal to about 5.0 MPa$^{1/2}$:

$$Ra = \{4 \times (18.0 - \delta_{D(solvent)})^2 + (9.3 - \delta_{P(solvent)})^2 + (7.7 - \delta_{H(solvent)})^2\}^{1/2} \quad \text{Equation 1}$$

wherein, in Equation 1, $\delta_{D(solvent)}$ MPa$^{1/2}$ denotes a solubility parameter due to dispersion force of the organic solvent, $\delta_{P(solvent)}$ MPa$^{1/2}$ denotes a solubility parameter due to polarity (dipole-dipole force) of the organic solvent, and $\delta_{H(solvent)}$ MPa$^{1/2}$ denotes a solubility parameter due to hydrogen bonding forces of the organic solvent.

4. The composition of claim 1, wherein a boiling point of the organic solvent at 1 atm is greater than or equal to about 160° C.

5. The composition of claim 1, wherein the organic solvent comprises an alcohol-based compound.

6. The composition of claim 1, wherein the composition to form the porous insulating layer further comprises a polyolefin-based polymer particle.

7. An electrode for a non-aqueous electrolyte rechargeable battery, the electrode comprising:
a current collector,
an active material layer on a main surface of a current collector, and
a porous insulating layer on the active material layer, the porous insulating layer being formed of the composition to form the porous insulating layer of claim 1,
wherein the active material layer comprises an active material to electrochemically intercalate and deintercalate lithium ions and an active material layer binder.

8. A non-aqueous electrolyte rechargeable battery comprising the electrode for the non-aqueous electrolyte rechargeable battery of claim 7.

9. A method for manufacturing an electrode for a non-aqueous electrolyte rechargeable battery, the method comprising:
forming a porous insulating layer on an active material layer on a current collector, the porous insulating layer being formed utilizing a composition to form a porous insulating layer,
wherein the active material layer comprises an active material to electrochemically intercalate and deintercalate lithium ions and an active material layer binder,
the composition to form the porous insulating layer comprises a solvent comprising an organic solvent, an insulating inorganic particle, and a porous insulating layer binder, and
the porous insulating layer binder is a polymer obtained by polymerization of monomers selected from the group consisting of about 30 wt % to about 60 wt % of an aromatic vinyl compound, about 20 wt % to about 69 wt % of (meth)acrylic acid ester, about 5 wt % to about 35 wt % of (meth)acrylic acid ester comprising a hydroxy group or an ether group, and about 1 wt % to about 10 wt % of a vinyl compound comprising an acidic functional group, based on a total weight of the binder,
wherein a distance between Hansen solubility parameters of the active material layer binder and the organic solvent is greater than or equal to about 8.0 MPa$^{1/2}$.

10. The method of claim 9, wherein a distance between Hansen solubility parameters of the active material and the organic solvent is greater than or equal to about 5.0 MPa$^{1/2}$.

11. The method of claim 9, wherein the organic solvent has a distance (Ra) with respect to graphene of Hansen solubility parameter calculated utilizing Equation 1 of greater than or equal to about 5.0 MPa$^{1/2}$:

$$Ra = \{4 \times (18.0 - \delta_{D(solvent)})^2 + (9.3 - \delta_{P(solvent)})^2 + (7.7 - \delta_{H(solvent)})^2\}^{1/2} \qquad \text{Equation 1}$$

wherein, in Equation 1, $\delta_{D(solvent)}$ MPa$^{1/2}$ denotes a solubility parameter due to dispersion force of the organic solvent, $\delta_{P(solvent)}$ MPa$^{1/2}$ denotes a solubility parameter due to polarity (dipole-dipole force) of the organic solvent, and $\delta_{H(solvent)}$ MPa$^{1/2}$ denotes a solubility parameter due to hydrogen bonding forces of the organic solvent.

12. The method of claim 9, wherein a boiling point of the organic solvent at 1 atm is greater than or equal to about 160° C.

13. The method of claim 9, wherein the organic solvent comprises an alcohol-based compound.

14. The method of claim 9, wherein the composition to form the porous insulating layer further comprises a polyolefin-based polymer particle.

* * * * *

UNITED STATES PATENT AND TRADEMARK OFFICE
CERTIFICATE OF CORRECTION

PATENT NO. : 12,015,155 B2
APPLICATION NO. : 16/779193
DATED : June 18, 2024
INVENTOR(S) : Tomoyuki Fukatani et al.

It is certified that error appears in the above-identified patent and that said Letters Patent is hereby corrected as shown below:

In the Claims

In Column 26, Line 31, in Claim 2, delete "corn position" and insert -- composition --.

Signed and Sealed this
Twelfth Day of November, 2024

Katherine Kelly Vidal
Director of the United States Patent and Trademark Office